United States Patent [19]

Schulz et al.

[11] 4,332,695

[45] Jun. 1, 1982

[54] HYDROCARBON EMULSIONS

[75] Inventors: Johann G. D. Schulz, Pittsburgh; John A. Cobler, Harwick, both of Pa.

[73] Assignee: Gulf Research & Development Company, Pittsburgh, Pa.

[21] Appl. No.: 110,796

[22] Filed: Jan. 9, 1980

[51] Int. Cl.$^3$ .............................................. B01J 13/00
[52] U.S. Cl. .................................... 252/312; 252/314; 252/356
[58] Field of Search ................. 252/312, 356; 562/410

[56] References Cited

U.S. PATENT DOCUMENTS

| | | | |
|---|---|---|---|
| 1,930,845 | 10/1933 | Ulrich et al. ......................... | 252/312 |
| 2,684,949 | 7/1954 | McMillan et al. ............... | 252/312 X |
| 2,949,426 | 8/1960 | Thiegs .............................. | 252/356 X |
| 4,052,448 | 10/1977 | Schulz et al. ...................... | 521/95 X |
| 4,235,728 | 11/1980 | Schulz et al. .................... | 562/410 X |

FOREIGN PATENT DOCUMENTS 721313  1/1955  United Kingdom ................ 252/312

OTHER PUBLICATIONS

Dunstan et al., *The Science of Petroleum*, vol. IV, Oxford University Press, London 1938, p. 2488.

*Primary Examiner*—Richard D. Lovering
*Attorney, Agent, or Firm*—Deane E. Keith; Forrest D. Stine; Joseph J. Carducci

[57] ABSTRACT

A hydrocarbon emulsion containing a hydrocarbon, water and the product resulting from the reaction of (1) polycyclic, polycarboxylic acids obtained as a result of the oxidation of coal with (2) a base.

12 Claims, No Drawings

HYDROCARBON EMULSIONS

BACKGROUND OF THE INVENTION

1. Field of the Invention

This invention relates to a hydrocarbon emulsion containing one or more hydrocarbons, water and the product resulting from the reaction of (1) polycyclic, polycarboxylic acids obtained as a result of the oxidation of coal with (2) a base and to a process for preparing such emulsion.

2. Description of the Prior Art

Hydrocarbon emulsions are well-known and are widely used, for example, fruit-tree spray formulations, cutting oils, lubricants, fuel mixtures, etc. It is an object herein to provide an aqueous hydrocarbon emulsion prepared using a relatively inexpensive emulsifier that is easily prepared and is stable in storage.

SUMMARY OF THE INVENTION

We have prepared stable aqueous hydrocarbon emulsions using as an inexpensive and extremely effective emulsifier therefor the product resulting from the reaction of (1) polycyclic, polycarboxylic acids obtained as a result of the oxidation of coal with (2) a base.

In preparing the emulsion we require only three components: water, a hydrocarbon material and the product resulting from the reaction of (1) polycyclic, polycarboxylic acids obtained as a result of the oxidation of coal with (2) a base.

The hydrocarbons that can be used to prepare the novel emulsions herein include organic compounds composed almost solely of carbon and hydrogen having from about five to about 100 carbon atoms, preferably from about six to about 75 carbon atoms. Thus, hydrocarbons that can be used include alkanes, such as n-hexane, n-octane, n-pentane, n-heptacosane, n-octacontane, etc., alkenes, such as octene-2, undecene-1, octadecene-1, eicosene-1, etc., and cycloalkanes, such as cyclohexane, cyclooctane, etc.

The polycyclic, polycarboxylic acids employed in the reaction with a base to obtain the product used to prepare the emulsion herein can be obtained by any conventional or suitable procedure for the oxidation of coal. Bituminous and subbituminous coals, lignitic materials and other types of coal products are exemplary of coals that are suitable herein. Some of these coals in their raw state will contain relatively large amounts of water. These can be dried prior to use, if desired, and preferably can be ground in a suitable attrition machine, such as a hammermill, to a size such that at least about 50 percent of the coal will pass through a 40-mesh (U.S. Series) sieve. The carbon and hydrogen content of the coal are believed to reside primarily in multi-ring aromatic and non-aromatic compounds (condensed and/or uncondensed), heterocyclic compounds, etc. On a moisture-free, ash-free basis the coal can have the following composition:

TABLE I

|  | Weight Per Cent | |
| --- | --- | --- |
|  | Broad Range | Preferred Range |
| Carbon | 45-95 | 60-85 |
| Hydrogen | 2.2-8 | 5-7 |
| Oxygen | 2-46 | 8-40 |
| Nitrogen | 0.7-3 | 1-2 |
| Sulfur | 0.1-10 | 0.2-5 |

Any conventional or suitable oxidation procedure can be used to convert the coal to the desired polycyclic, polycarboxylic acids. For example, a stirred aqueous slurry containing coal in particulate form, with or without a catalyst, such as cobalt, manganese, vanadium, or their compounds, can be subjected to a temperature of about 60° to about 225° C. and an oxygen pressure of about atmospheric (ambient) to about 2000 pounds per square inch gauge (about atmospheric to about 13.8 MPa) for about one to about 20 hours. The product so obtained can then be subjected to mechanical separation, for example, filtration, and solid residue can be washed with water, if desired, and dried. The solid product remaining will be a mixture of water-insoluble polycyclic, polycarboxylic acids, hereinafter referred to as "water-insoluble coal carboxylate". A preferred procedure for preparing such coal carboxylate involves subjecting a slurry containing coal in particulate form to oxidation with nitric acid. An exemplary procedure for so converting coal to coal carboxylate is disclosed, for example, in U.S. Pat. No. 4,052,448 to Schulz et al. Thus, a slurry containing coal can be subjected to reaction with aqueous nitric acid having a concentration of about one to about 90 percent, preferably about three to about 70 percent, at a temperature of about 15° to about 200° C., preferably about 25° to about 100° C., and a pressure of about atmospheric to about 2000 pounds per square inch gauge (about atmospheric to about 13.8 MPa), preferably about atmospheric to about 500 pounds per square inch gauge (about atmospheric to about 3.5 MPa), for about five minutes to about 15 hours, preferably about two to about six hours. The oxidation with nitric acid, can, if desired, be carried out in an atmosphere containing molecular oxygen, as, for example, in U.S. patent application Ser. Nos. 923,953 and 924,054, filed July 12, 1978 now U.S. Pat. No. 4,195,185 and U.S. Pat. No. 4,195,186, respectively, of Schulz et al. The resulting product is then subjected to mechanical separation, for example filtration, and the solid residue can be washed with water, if desired, and dried to produce the water-insoluble coal carboxylate.

The entire mixture of water-insoluble coal carboxylate so obtained, or any portion thereof, can be used in the reaction with a base herein, if desired. An example of a portion of the entire mixture of water-insoluble coal carboxylate that can be used in the reaction with a base is the extract obtained as a result of the extraction of the entire mixture of water-insoluble coal carboxylate with a polar solvent as defined in U.S. Pat. No. 4,052,448 to Schulz et al. Another example of a portion of the water-insoluble coal carboxylate that can also be reacted with a base herein is that portion of the water-insoluble coal carboxylate that is insoluble in a polar solvent as defined in U.S. Pat. No. 4,147,882 to Schulz et al. Still another example of polycyclic, polycarboxylic acids that can be reacted with a base herein are the water-soluble polycyclic, polycarboxylic acids present in the filtrate obtained when coal is oxidized and the resulting product is subjected to filtration, as for example, the water-soluble, polar solvent-soluble carboxylic acids obtained in U.S. Pat. No. 4,137,418 to Schulz et al. These can be referred to as "water-soluble coal carboxylate". For simplicity, all of these acids can be referred to as "coal carboxylate".

The individual components of the coal carboxylate are believed to be composed of condensed and/or non-condensed aromatic and non-aromatic rings, with an average number of such rings in the individual molecules ranging from about one to about ten, but generally from about two to about eight. On the average it is believed the number of carboxyl groups carried by the individual molecules will range from about two to about eight, generally from about three to about eight. The average molecular weight can range from about 200 to about 3000, but generally can be from about 300 to about 3000 and the average neutral equivalent from about 50 to about 900, generally from about 70 to about 600. A typical analysis of the coal carboxylates on a moisture-free and ash-free basis that will be reacted with the base herein is set forth below in Table II.

TABLE II

|  | Weight Per Cent | |
| --- | --- | --- |
|  | Broad Range | Preferred Range |
| Carbon | 35 to 65 | 37 to 62 |
| Hydrogen | 1 to 5 | 3 to 5 |
| Nitrogen | 1 to 6 | 3 to 6 |
| Oxygen | 20 to 60 | 30 to 50 |
| Sulfur | 0.1 to 8 | 0.1 to 5 |

Any base, including the corresponding or basic salt, organic or inorganic, that can react with an acid can be used herein to react with the coal carboxylate. Thus, hydroxides of the elements of Group IA and Group IIA of the Periodic Table can be used. Of these we prefer to use potassium, sodium or calcium hydroxide. In addition ammonium hydroxide can also be used. Among the organic bases that can be used are aliphatic amines having from one to 12 carbon atoms, preferably from one to six carbon atoms, such as methylamine, ethylamine, ethanolamine and hexamethylenediamine, aromatic amines having from six to 60 carbon atoms, preferably from six to 30 carbon atoms, such as aniline and naphthylamine, aromatic structures carrying nitrogen as a ring constituent, such as pyridine and quinoline, etc. By "basic salt" we mean to include salts of the elements of Group IA and IIA of the Periodic Table whose aqueous solutions exhibit a pH in the basic region, such as potassium carbonate, sodium metasilicate, calcium acetate, barium formate, etc.

The reaction between the coal carboxylate and the base is easily effected. The amounts of reactants are so correlated that the amount of base used is at least that amount stoichiometrically required to react with all, or a portion (for example, at least about 10 percent, preferably at least about 50 percent), of the carboxyl groups present in the coal carboxylate. This can be done, for example, by dispersing the coal carboxylate in an aqueous medium, such as water, noting the initial pH thereof, adding base thereto while stirring and continuing such addition while noting the pH of the resulting mixture. Such addition can be stopped anytime. In the preferred embodiment wherein a large portion or substantially all of the carboxyl groups are desirably reacted with the base, addition of base is continued until a stable pH reading is obtained. The reactions can be varied over a wide range, for example, using a temperature of about 5° to about 150° C., preferably about 15° to about 90° C., and a pressure of about atmospheric to about 75 pounds per square inch gauge (about atmospheric to about 0.5 MPa), preferably about atmospheric (about 0.1 MPa). The resulting product can then be subjected, for example, to a temperature of about 20° to about 200° C. under vacuum to about 100 pounds per square inch gauge (under vacuum to about 0.69 MPa) for the removal of water therefrom. However, if desired the water need not be removed from the total reaction product and the total reaction product, or after removal of a portion of the water therefrom, can be used to prepare the emulsions as taught herein.

The amounts of each component present in the emulsion prepared herein can be varied over a wide range. Thus, the weight ratio of hydrocarbon to water can be in the range of about 19:1 to about 1:6, preferably in the range of about 4:1 to about 1:4. The amount of emulsifier used, that is, the product resulting from the reaction of coal carboxylate with a base, on a weight basis, relative to water, can be in the range of about 1:199 to about 1:3, preferably in the range of about 1:49 to about 1:4.

The emulsions defined and claimed herein are easily prepared. A convenient procedure involves introducing the emulsifier into water, while mixing for a time sufficient to dissolve and/or disperse the emulsifier therein, for example, for a period of about 0.01 to about four hours. If desired, the emulsifier can be prepared in situ by separately introducing into the water the coal carboxylate and base and following the procedure hereinabove defined. To the mixture so prepared there is then added the bituminous material and mixing of the resulting mixture is continued, for example, from about 0.1 to about 10 hours, sufficient to obtain the desired emulsion. Mixing can be effected in any suitable manner, for example, using propeller agitation, turbine agitation, colloid mill, etc. The emulsions so prepared are stable, that is, there is no separation of water from the hydrocarbons and there is no agglomeration of hydrocarbons into larger size entities. When desired, however, the emulsions herein can easily be broken, for example, mechanically by bringing the same into contact with a body, for example, plants, or chemically, for example, by contact with an acid solution, such as hydrochloric acid.

A number of mixtures of polycyclic, polycarboxylic acids (coal carboxylate) were prepared as follows:

COAL CARBOXYLATE A

To a one-gallon glass reactor equipped with a mechanical stirrer and heating and cooling coils there were charged 320 milliliters of water and 100 milliliters of 70 percent aqueous nitric acid. This mixture was heated to 80° C. and maintained at this temperature during the run. There was then concurrently added to the reactor over a period of 1.75 hours 475 milliliters of 41.5 percent aqueous nitric acid and 800 grams of powdered English Rank 900 coal. Over an additional period of 1.25 hours there was added an additional 310 milliliters of 41.5 percent aqueous nitric acid. The resulting mixture was then maintained at the designated temperature for one hour, after which over a period of three hours there was added additional 785 milliliters of 41.5 percent aqueous nitric acid. During the entire reaction period the reaction mixture was maintained at autogeneous pressure. The reaction mixture was then maintained at 80° C. for an additional hour, cooled to room temperature and then removed from the reactor and filtered. The recovered solids were washed three times with water (1000 cubic centimeters of water each time), dried in a vacuum oven, resulting in the recovery of 714.4 grams of material, of which 100 grams thereof was extracted with 1.5 liters of acetone. The extract was dried to remove acetone therefrom, resulting in the production of 46.6 grams of solvent-soluble particulate polycyclic, polycarboxylic acids.

COAL CARBOXYLATE B

In this run there was charged to the reactor 320 milliliters of water and 100 milliliters of 70 per cent aqueous nitric acid. The reactor was heated to 80° C. while the contents were stirred, after which there were added concurrently over a period of 1.6 hours 800 grams of English Rank 900 coal and 570 milliliters of 27.7 percent aqueous nitric acid. Upon completion of such addition, there was added over a period of 1.4 hours an additional 490 milliliters of 27.7 percent aqueous nitric acid. The mixture was then held at 80° C. for an additional hour, cooled and worked up as in the preparation of Coal Carboxylate A. There was recovered 90.6 grams of solvent-insoluble polycyclic, polycarboxylic acids.

COAL CARBOXYLATE C

The preparation herein followed the procedure used in the preparation of Coal Carboxylate B except that in the second addition 800 grams of English Rank 900 coal and 388 milliliters of 13.9 percent aqueous nitric acid were added to the reactor over a period of 1.5 hours and 410 milliliters of 13.9 percent aqueous nitric acid were thereafter added to the reactor over a period of 1.5 hours. The reaction mixture was cooled to room temperature and then removed from the reactor and filtered. The recovered solids were washed three times with water (1000 cubic centimeters of water each time), dried in a vacuum oven, resulting in the recovery of 718.1 grams of polycyclic, polycarboxylic acids.

COAL CARBOXYLATE D

In this run there were charged to the reactor 320 milliliters of water and 100 milliliters of 70 percent aqueous nitric acid. After the contents of the reactor were heated to 60° C. with stirring, there was added concurrently over a period of 1.3 hours 800 grams of powdered North Dakota lignite and 340 milliliters of 9.5 percent aqueous nitric acid. Over the next 1.7 hours there was added an additional 400 milliliters of 9.5 percent aqueous nitric acid. The reaction mixture was then held at 60° C. for four hours, cooled and worked up as in the preparation of Coal Carboxylate C. There was recovered 559.2 grams of polycyclic, polycarboxylic acids.

COAL CARBOXYLATE E

Following the procedure used in the preparation of Coal Carboxylate D, the initial charge of water and nitric acid was heated to 80° C. and then 800 grams of North Dakota lignite and 990 milliliters of 24.7 per cent aqueous nitric acid were added to the reactor over a period of four hours. The reaction mixture was held at 80° C. for 1.5 hours before cooling and work-up. 559.8 grams of polycyclic, polycarboxylic acids were recovered.

COAL CARBOXYLATE F

In this run there were charged to the reactor 978 milliliters of water and 178.6 milliliters of 70 percent aqueous nitric acid. The mixture was heated to 60° C., with stirring and maintained at this temperature during the run. To the resulting mixture there was added a slurry comprised of 800 grams of North Dakota lignite and 800 milliliters of water over a one hour period. The mixture was held at 60° C. for three hours, cooled to room temperature and worked up as in the preparation of Coal Carboxylate C resulting in the production of 560 grams of polycyclic, polycarboxylic acids.

The North Dakota lignite used above analyzed as follows: 33.0 weight percent water, 45.7 weight percent carbon, 2.8 weight percent hydrogen, 11.3 weight percent oxygen, 0.6 weight percent sulfur, 0.6 weight percent nitrogen and 6.0 weight percent metals. English Rank 900 coal analyzed as follows: 13.6 weight percent water, 63.6 weight percent carbon, 4.3 weight percent hydrogen, 12.9 weight percent oxygen, 1.2 weight percent sulfur, 1.3 weight percent nitrogen and 3.1 weight percent metals.

A number of emulsions was prepared as follows. Into a Waring Blender there were placed water, coal carboxylate and pellets of either sodium hydroxide or potassium hydroxide or ammonium hydroxide. These materials were mixed at low speeds (about 500 RPM) for about five minutes, sufficient to obtain a reaction product between the coal carboxylate and the base. To the resulting solution there was added hydrocarbon and the resulting mixture was mixed at high speed (about 20,000 RPM) for about 20 minutes, sufficient to obtain an emulsion. The emulsions so prepared were examined at various intervals of time for stability by noting whether or not a separation of hydrocarbon and water had occurred.

The data obtained are tabulated below in Table III.

TABLE III

| Example No. | Hydrocarbon | Grams of Hydrocarbon | Water, Grams | Coal Carboxylate | Grams of Coal Carboxylate | Base | Grams of Base | Stability, Days[1] |
|---|---|---|---|---|---|---|---|---|
| I | Hexane[2] | 66 | 100 | A | 20 | NaOH | 4 | 100 |
| II | Hexane | 66 | 100 | B | 20 | NaOH | 4 | 100 |
| III | Hexane | 66 | 100 | C | 20 | NaOH | 4 | 100 |
| IV | Hexane | 66 | 100 | D | 5 | NaOH | 4 | 100 |
| V | Hexane | 66 | 100 | E | 5 | NaOH | 1.7 | 84 |
| VI | $C_{18}$ Alkane Dimer | 100 | 100 | F | 10 | NaOH | 5.0 | 12 |
| VII | n-Octane | 100 | 100 | F | 10 | NaOH | 5.0 | 12 |
| VIII | Octadecene-1 | 91 | 100 | F | 10 | NaOH | 5.0 | 12 |
| IX | Octene-2 | 100 | 100 | F | 10 | NaOH | 5.0 | 12 |
| X | Cyclohexane | 100 | 100 | F | 10 | NaOH | 5.0 | 12 |

[1] Last day of observation; no separation of water from emulsion noted.
[2] Mixtures of hexanes.

The data in Table III clearly exemplifies the stability of the emulsions claimed herein.

Obviously, many modifications and variations of the invention, as hereinabove set forth, can be made without departing from the spirit and scope thereof and therefore only such limitations should be imposed as are indicated in the appended claims.

We claim:

1. A hydrocarbon emulsion containing hexane, water and the product resulting from the reaction of (1) polycyclic, polycarboxylic acids obtained as a result of the oxidation of coal with (2) a base, wherein the weight ratio of hydrocarbon to water is in the range of about 4:1 to about 1:4 and the weight ratio of said product to water is in the range of about 1:49 to about 1:4.

2. The emulsion of claim 1 wherein said product is water soluble.

3. The emulsion of claim 1 wherein said product is water insoluble.

4. The emulsion of claim 1 wherein said polycyclic, polycarboxylic acids are obtained as a result of the nitric acid oxidation of coal, said oxidation comprising subjecting a slurry containing coal to reaction with nitric acid having a concentration of about one to about 90 percent at a temperature of about 15° to about 200° C. for about five minutes to about 15 hours.

5. The emulsion of claim 1 wherein said polycyclic, polycarboxylic acids are obtained as a result of the nitric acid oxidation of coal, said oxidation comprising subjecting a slurry containing coal to reaction with nitric acid having a concentration of about three to about 70 percent at a temperature of about 50° to about 100° C. for about two to about six hours.

6. The emulsion of claim 1 wherein said base is an organic base.

7. The emulsion of claim 1 wherein said base is a hydroxide of an element of Group IA of the Periodic Table.

8. The emulsion of claim 1 wherein said base is a hydroxide of an element of Group IIA of the Periodic Table.

9. The emulsion of claim 1 wherein said base is sodium hydroxide.

10. The emulsion of claim 1 wherein said base is potassium hydroxide.

11. The emulsion of claim 1 wherein said base is calcium hydroxide.

12. The emulsion of claim 1 wherein said reaction with said base is carried out at a temperature of about 5° to about 150° C.

* * * * *